(No Model.) 2 Sheets—Sheet 1.

D. G. AUCHEY.
HORSE HAY RAKE.

No. 463,299. Patented Nov. 17, 1891.

Witnesses
Chas. E. Gorton
A. S. Wills

Inventor
David G. Auchey
By his Attorney
Joseph G. Parkinson

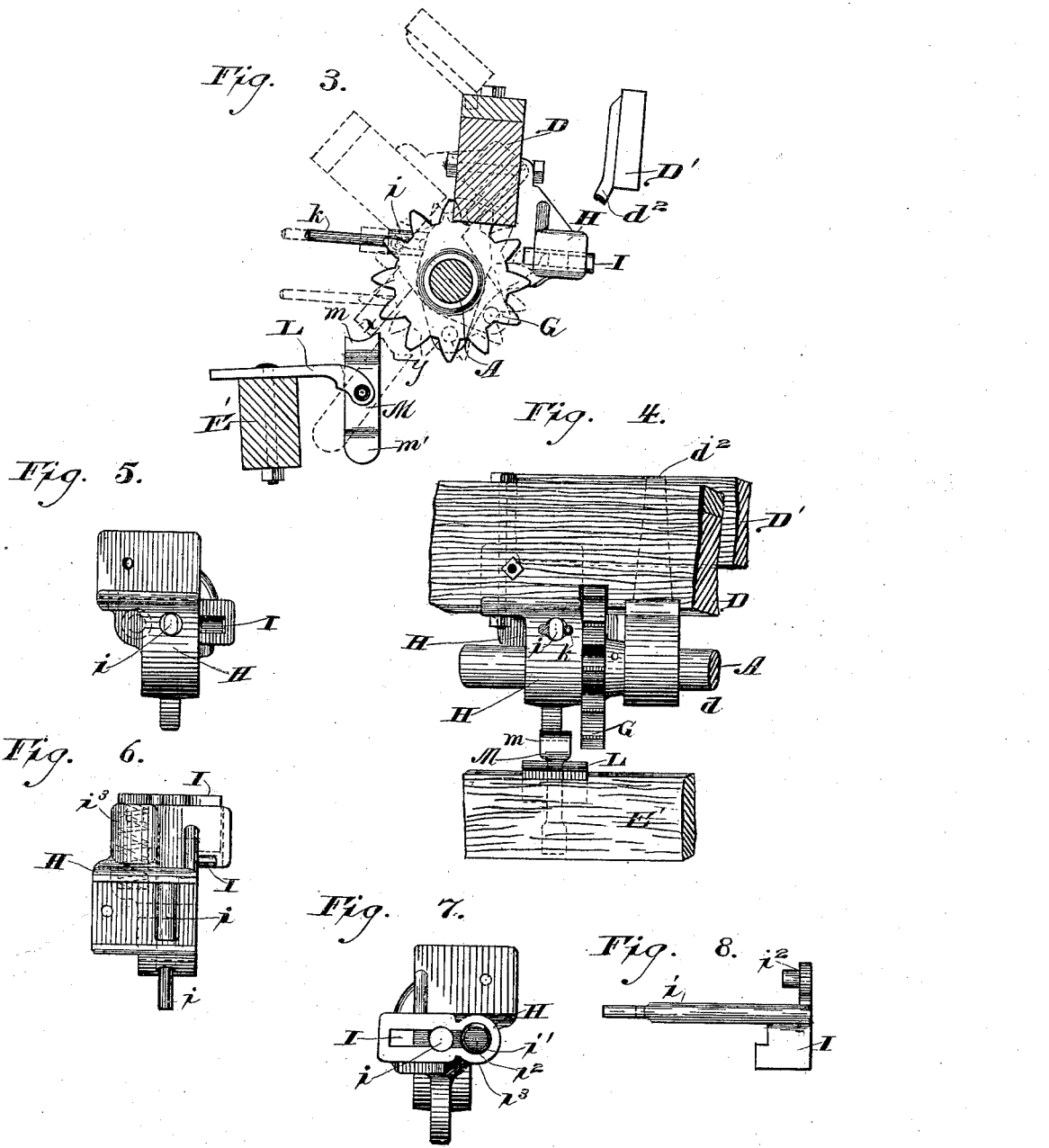

UNITED STATES PATENT OFFICE.

DAVID G. AUCHEY, OF DAYTON, OHIO, ASSIGNOR TO SEBASTIAN RITTY, OF SAME PLACE.

HORSE HAY-RAKE.

SPECIFICATION forming part of Letters Patent No. 463,299, dated November 17, 1891.

Application filed January 12, 1891. Serial No. 377,579. (No model.)

*To all whom it may concern:*

Be it known that I, DAVID G. AUCHEY, a citizen of the United States, residing at Dayton, in the county of Montgomery and State of Ohio, have invented certain new and useful Improvements in Horse Hay-Rakes, of which the following is a specification.

This invention relates to improvements upon automatic tripping mechanism employed in that class of horse hay-rakes wherein the load is dumped by the draft of the team, and particularly to improvements upon the tripping mechanism shown and described in Letters Patent of the United States granted Sebastian Ritty on the 10th day of August, 1886, No. 346,947, wherein a reciprocating dog mounted in a housing attached to the rake-head is caused to engage with a ratchet-wheel upon the revolving through-axle, around which the said rake-head vibrates, so that the continued revolution of the axle may raise the teeth to discharge the accumulated load, and the dog then be released from engagement with said ratchet by means of a fixed stop upon the draft-frame, allowing the rake-head to return to working position by gravity. In such construction the stop against which the trip-arm of the dog strikes or is brought by the revolution of the axle, whereby it is checked relatively to the motion of the said axle until disengaged from the ratchet, is a flat and stationary plate tangential to a circle described from the center of oscillation of the rake-head and housing, and therefore the end of the dog, striking it first at a greater distance from the axle, is dragged inward along said plate before entirely disengaged from the ratchet, causing increased friction and to some extent danger of cramping and bending.

In my improvement I propose to replace the fixed stop-plate of the Ritty device by a pivoted stop or tumbler sufficiently weighted at its lower end to hang in a vertical position and to be restored thereto whenever displaced, arranging said stop so that its upper end may be struck by the end or spindle or other operating-arm of the dog as it is brought around by the revolution of the axle, and that the two may then move together toward a common line with a sort of toggle action until the dog is released from the ratchet, when of course the tumbler will be released from the dog by the recession of the rake-head and will gravitate back to its normal position for the next dumping operation.

Figure 1:
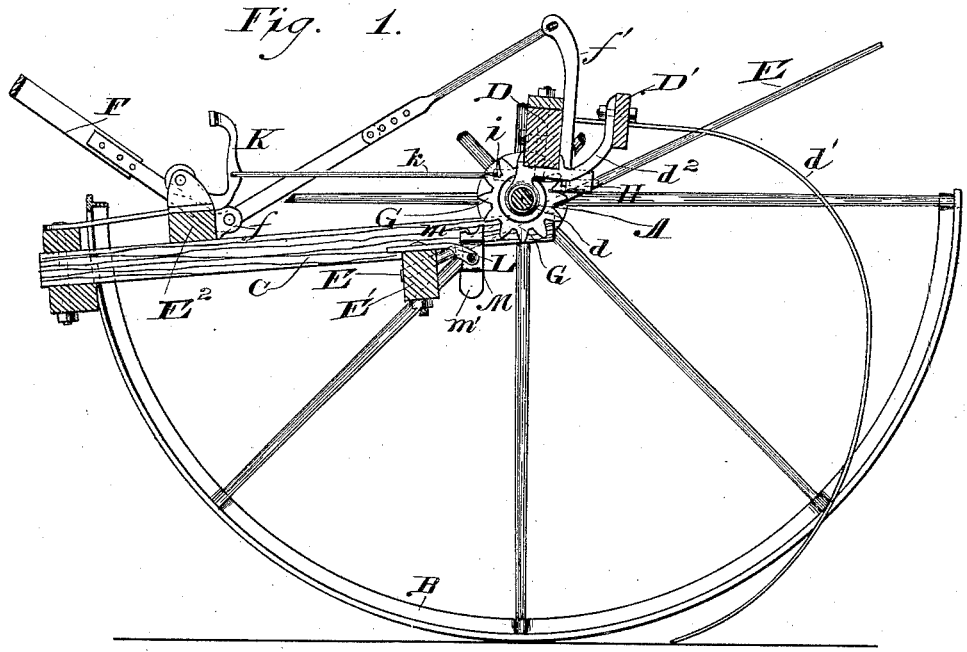
Figure 2:
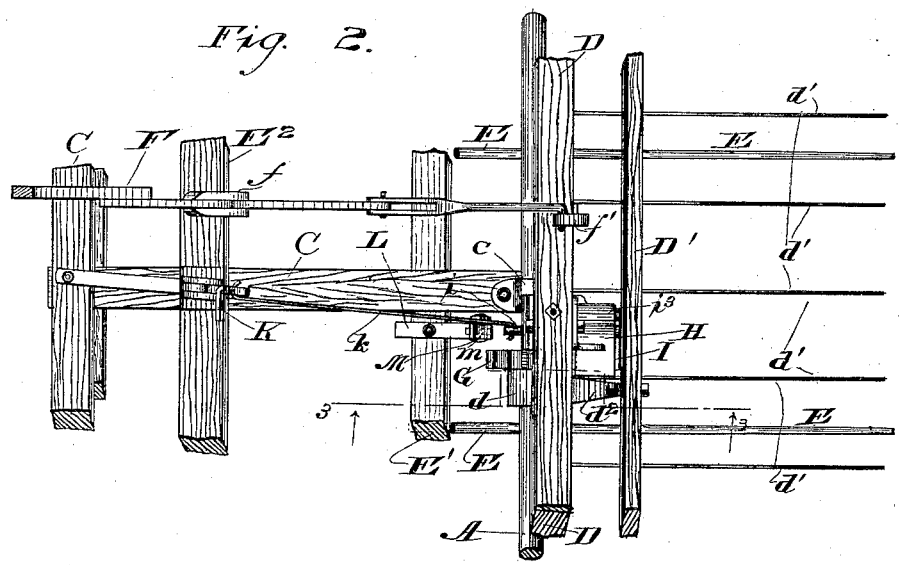

In the drawings, Figure 1 is a vertical longitudinal section through a draft-dumping horse-rake embodying my invention, the upper part of the exposed carrying-wheel being broken away. Fig. 2 is a top plan view of so much of the draft-frame, axle, and rake-head with my improvement attached as is necessary to an explanation thereof. Fig. 3 is an enlarged detail in section on the correspondingly-numbered line of the preceding figure, showing in diagram the action of the tripping devices. Fig. 4 is an enlarged detail on the same scale as the preceding and of the same parts in front elevation. Fig. 5 is a front elevation of the housing for the trip-dog detached and enlarged; Fig. 6, a top plan view of said housing, showing the dog in position; Fig. 7, a rear elevation of said housing, and Fig. 8 the dog detached.

A represents the revolving through-axle of a horse-rake of the type referred to; B, a carrying-wheel, of which there will be two, one connected to each end of the axle by backing-ratchets in the usual manner, so that they may revolve the axle only when going forward, and that one advancing wheel may turn the axle whenever the other happens to be idle—as, for instance, in turning corners.

C is the draft-frame connected with the axle by bearing-boxes $c$, and constructed with any appropriate number of cross-bars for the attachment of the various levers and other parts of the mechanism for the control of the dumping devices. Above the axle is a rake-head D, of wood, and sustained and made free to vibrate around said axle by means of bearing-boxes $d$ at suitable intervals. To this rake-head the ends of the teeth $d'$ are connected in any usual way, and behind and parallel with it is a guide-bar D', supported by brackets $d^2$ from said head, and having a series of vertical slots for the independent spacing and up-and-down play of each rake-tooth. Stripper-fingers E pass at proper intervals between the rake-teeth and are rigidly supported from a cross-bar E', secured beneath the draft-frame in front of the axle and serving, as will hereinafter appear, for the support of the trip stop or tumbler. On top of the draft-frame, and some distance in advance of the just-mentioned underlying cross-bar, is a second cross-bar E², from the rear of which projects a short bracket $f$, serving as a pivotal support for the hand-lever F, link-connected with a standard $f'$ from the rake-head, so that by manipulating the lever the rake-head can be oscillated to dump the load or can be raised and held elevated for transportation.

Pinned fast to the revolving through-axle and about centrally of its length is the ratchet-wheel G, and alongside this ratchet-wheel is a housing H, secured to the rake-head and having therein a horizontal bearing for the arm or spindle $i$ of the dog I, arranged to engage with the teeth of the ratchet-wheel, as in the before-mentioned patent, and held normally out of engagement by means of a spring $i'$, seated at one end against a heel-projection $i^2$ from said dog and at the other resting in a socket $i^3$ in the housing. The end of this spindle is suitably connected—as, for instance, by a link $k$—with a foot-lever K, pivoted in a bracket on one of the front cross-bars of the draft-frame, conveniently the same one which supports the hand-lever, or, if desired, a chain may be used, as in the Ritty device. Pressure upon the foot-lever in the forward direction draws upon the spindle of the trip-dog and, compressing the spring, causes the dog itself to engage with the ratchet-wheel, which will hold it by friction while the revolution of the axle carries it around, lifting the rake-head.

Now in order to trip or release the dog, I pivot to a bracket L, secured to the draft-frame—for instance, to the rear cross-bar of said frame or the one which supports the stripper-fingers—a weighted stop or tumbler M, rounded or notched at its upper end $m$, which intersects the arc described by the end of the trip-dog spindle, and weighted or having a bob $m'$ at its lower end to hold it normally in a vertical position. With this arrangement the revolution of the axle and the accompanying oscillation of the rake-head will bring the end of the trip-dog spindle around in an arc until it strikes the top of the tumbler, as shown at the point $x$, Fig. 3, when the further revolution of the axle will carry said tumbler, with the end of the spindle pressing against it, around to the position shown at $y$, which is nearer to the axle and rake-head than the first point of contact. When the end of the spindle first strikes the tumbler, the longitudinal axes of the two will form an angle; but the further movement will bring them into a straight line. Thus by the attendant toggle action pushing the spindle back sufficiently to release the dog from the teeth of the ratchet, when the weight of the rake-teeth and other attachment to the rake-head will carry the latter back to its normal effective position. The tumbler as soon as it is released will also be carried back to its normal vertical position by the gravitation of its weighted lower end, and the rake will be ready for the next dumping operation.

I do not limit myself to a trip-dog constructed integral with an arm or spindle which comes against and is stopped by a pivoted gravity trip-stop, as it is evident that such trip-stop may act in the same manner and secure the same result when used in connection with any arm or lever mediately or immediately connected with the trip-dog and supported from the rake-head, so as to be carried in an arc around the axle with the oscillation of the rake-head; nor do I limit myself to a gravitating trip-stop, technically understood, considering that a spring may be substituted for the bob or weight at the lower end of the pivoted stop, and, by pressure or tension, act equivalently to restore it to position after the rake-head has been tripped; but What I do claim is—

1. The combination, substantially as hereinbefore set forth, of the revolving axle, the carrying wheels, the rake-head connected with said axle by bearings which permit it to oscillate thereabout, the ratchet-wheel secured to the axle, a dog carried by the rake-head for engagement with said ratchet-wheel, and a pivoted trip-stop arranged to be struck by a rod or arm connected with the dog to release the rake-head.

2. The combination, substantially as hereinbefore set forth, of the revolving axle, the carrying-wheels, the oscillating rake-head, the ratchet-wheel upon the axle, the sliding dog, and the pivoted gravity-stop upon the draft-frame.

3. The combination, substantially as hereinbefore set forth, of the revolving axle, the carrying-wheels, the oscillating rake-head, the draft-frame, the foot-lever upon the draft-frame, the trip-dog upon the rake-head, the link connecting said dog with the foot-lever, the ratchet-wheel upon the revolving axle, and the pivoted trip-stop or tumbler weighted at its lower end.

DAVID G. AUCHEY.

Witnesses:
CHAS. E. SWADENER,
CHAS. W. SLENTZ.